(12) United States Patent
Khullar

(10) Patent No.: US 7,023,824 B2
(45) Date of Patent: Apr. 4, 2006

(54) METHOD, APPARATUS, AND SYSTEM FOR OPTIMIZING TRANSMISSION POWER AND BIT RATE IN MULTI-TRANSMISSION SCHEME COMMUNICATION SYSTEMS

(75) Inventor: Anders Khullar, Bjärred (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 962 days.

(21) Appl. No.: 09/794,681

(22) Filed: Feb. 27, 2001

(65) Prior Publication Data

US 2002/0154611 A1    Oct. 24, 2002

(51) Int. Cl.
*H04J 3/00* (2006.01)

(52) U.S. Cl. .............. 370/337; 370/252; 370/347; 455/452.2; 455/522

(58) Field of Classification Search .......... 370/252, 370/328, 332, 333, 337, 347; 455/69, 522
See application file for complete search history.

(56) References Cited

U.S. PATENT DOCUMENTS

| | | | |
|---|---|---|---|
| 5,594,720 A * | 1/1997 | Papadopoulos et al. ...... 370/330 |
| 5,722,051 A * | 2/1998 | Agrawal et al. ............. 455/69 |
| 5,732,328 A * | 3/1998 | Mitra et al. ............... 455/69 |
| 5,982,766 A | 11/1999 | Nyström et al. |
| 6,097,965 A | 8/2000 | Honkasalo et al. |
| 6,134,230 A | 10/2000 | Olofsson |
| 6,181,686 B1 * | 1/2001 | Hamalainen et al. ........ 370/347 |
| 6,330,462 B1 * | 12/2001 | Chen .......................... 455/572 |

(Continued)

FOREIGN PATENT DOCUMENTS

EP    0 847 515    6/1998

(Continued)

OTHER PUBLICATIONS

ETSI TS 100 573; V8.4.0 (Jul. 2000), "Digitial Cellular Telecommunications System (Phase 2 + ); Physical Layer on the Radio Path; General Description" (GSM 05.01 version 8.4.0 Release 1999).

*Primary Examiner*—Steven Nguyen
*Assistant Examiner*—Clemence Han
(74) *Attorney, Agent, or Firm*—Potomac Patent Group PLLC

(57) ABSTRACT

Method, apparatus, and system for exchanging information in a communication system having a plurality of transmission schemes are presented. A first power level is selected at which slices of information are capable of being exchanged over a communication link at a first slice rate. A first transmission scheme is selected that produces an acceptable link performance when exchanging information over the communication link at the first power level. The first power level is reduced to a second power level. A second transmission scheme is selected for exchanging information over the communication link at the second power level that produces at least the acceptable link performance produced when exchanging information over the communication link at the first power level using the first transmission scheme. Slices of information are exchanged over the communication link at the second power level and at a second slice rate using the second transmission scheme. The second slice rate is at most equal to the first slice rate multiplied by a ratio of the first power level divided by the second power level.

28 Claims, 3 Drawing Sheets

U.S. PATENT DOCUMENTS

| | | | |
|---|---|---|---|
| 6,456,598 B1 * | 9/2002 | Le Strat et al. | 370/252 |
| 6,748,021 B1 * | 6/2004 | Daly | 375/261 |
| 6,754,169 B1 * | 6/2004 | Baum et al. | 370/204 |
| 6,760,882 B1 * | 7/2004 | Gesbert et al. | 714/774 |
| 2002/0056066 A1 * | 5/2002 | Gesbert et al. | 714/759 |
| 2002/0058482 A1 * | 5/2002 | Agin et al. | 455/69 |
| 2002/0080735 A1 * | 6/2002 | Heath et al. | 370/328 |

FOREIGN PATENT DOCUMENTS

| | | |
|---|---|---|
| WO | 00/13362 | 3/2000 |
| WO | 00/31990 | 6/2000 |

* cited by examiner

Input signal level (for normal BTS) at reference performance for 8-PSK modulated signals

| GSM 900, GSM 850 and MXM 850 | | | | | | |
|---|---|---|---|---|---|---|
| Type of Channel | | static | Propagation Conditions | | | |
| | | | TU50 (no FH) | TU50 (ideal FH) | RA250 (no FH) | HT100 (no FH) |
| PDTCH/MCS-5 | dBm | -101 | -96.5 | -97 | -96 | -95 |
| PDTCH/MCS-6 | dBm | -99.5 | -94 | -94.5 | -91 | -91 |
| PDTCH/MCS-7 | dBm | -96 | -89 | -88.5 | -87** | -86** |
| PDTCH/MCS-8 | dBm | -93 | -84 | -84 | * | -81.5** |
| PDTCH/MCS-9 | dBm | -91.5 | -80 | -80 | * | * |
| DCS 1 800, PCS 1900 and MXM 1900 | | | | | | |
| Type of Channel | | static | Propagation Conditions | | | |
| | | | TU50 (no FH) | TU50 (ideal FH) | RA130 (no FH) | HT100 (no FH) |
| PDTCH/MCS-5 | dBm | -101 | -96.5 | -97 | -96 | -93 |
| PDTCH/MCS-6 | dBm | -99.5 | -94 | -94 | -91 | -85.5 |
| PDTCH/MCS-7 | dBm | -96 | -87 | -86.5 | -87** | * |
| PDTCH/MCS-8 | dBm | -93 | -86.5** | -86.5** | * | * |
| PDTCH/MCS-9 | dBm | -91.5 | -83** | -83** | * | * |

Performance is specified at 30% BLER for those cases identified with mark**.

Note 1: Ideal FH case assumes perfect decorrelation between bursts. This case may only be tested if such a decorrelation is ensured in the test. For TU50 (ideal FH), sufficient decorrelation may be achieved with 4 frequencies spaced over 5 MHz.

Note 2: PDTCH for MCS-x can not meet the reference performance for some propagation conditions (*).

TU50 - Typical urban environment; mobile unit moving at 50 Km/hr.
RA250 - Rural area environment; mobile unit moving at 250 Km/hr.
HT100 - Hilly terrain environment; mobile unit moving at 100 Km/hr.
FH - Frequency hopping.

FIG. 3

METHOD, APPARATUS, AND SYSTEM FOR OPTIMIZING TRANSMISSION POWER AND BIT RATE IN MULTI-TRANSMISSION SCHEME COMMUNICATION SYSTEMS

BACKGROUND

This invention relates generally to a method, apparatus, and system for optimizing transmission power and bit rate in multi-transmission scheme communication systems. More specifically, this invention relates to a method, apparatus, and system for optimizing transmission power and bit rate in multi-transmission scheme communication systems that employ variable modulation schemes and/or coding rates.

Many of today's communication systems use multiple transmission schemes to exchange network information. One such system, popular in today's cellular networks, is the Global System for Mobile Communications transmission scheme, or GSM. GSM uses a Time Division Multiple Access (TDMA) access scheme. The basic radio resource in a GSM system is a time slot, lasting approximately 577 µs, and transmitting information at a modulation rate of approximately 271 Kbit/s. Each time slot carries a slice of information approximately 156 symbols (577 µs*271 Kbit/s) in length, known as a burst. GSM time slots are grouped into TDMA frames, each frame comprising eight time slots. TDMA frames are grouped into either 26-frame or 51-frame multiframes. The TDMA multiframes are then grouped into a TDMA superframe, which in turn are grouped to form a TDMA hyperframe.

GSM systems transmit and receive information over a band of radio frequency (RF) carriers, typically around 900 MHZ. The frequency separation between carriers in an RF band is specified to be 200 KHz. Each GSM carrier comprises eight basic physical channels. Information carried over these channels switches carriers, or "hops" between carriers, several times according to a predefined sequence when being transferred from/to mobile stations (MS) to/from base stations (BS) operating in the network. The frequency hopping sequences are chosen to be orthogonal within a cell to maximize use of the available spectrum in the RF band. Thus, a GSM physical channel is defined as a sequence of TDMA frames, a time slot number (modulo 8), and a frequency hopping sequence.

Before being modulated over the various physical channels, digitally sampled speech and data is first coded by a channel codec to arrange the information into the final form necessary for RF transmission. Channel coding involves adding additional data for channel control, training sequences, and tail/guard bits. In addition, the channel coder must interleave the data to enhance the performance of the error correction and to rearrange the data into packets for transmissions. Training sequence data is added for equalization of the RF channel, while tail/guard bits provide a buffer between adjacent data packets. The coding process represents a signaling overhead that adds a significant number of bits of information to the burst, thus reducing the overall information-carrying capacity and net throughput of the physical channels.

After being coded and packetized, information bursts are ready to be modulated onto the carriers for transmission to or from the MS or BS. GSM uses a type of modulation known as shift keying, which is particularly suited for modulating digital signals. At the time of its inception, GSM used only one type of modulation, known as Gaussian Minimum Shift Keying (or GMSK). In this type of modulation, the phase of the modulated signal is rotated along the unit circle in increments of $\pi/2$. Increasing phase represents one bit value (perhaps a "1"), while decreasing phase represents the other bit value (perhaps a "0"). Thus each symbol represents one bit of information in the modulated signal. As indicated by its name, GMSK uses a Gaussian bandpass filter to filter the modulated signal prior to being transmitted on the carrier. The resultant filtered waveform has only a minimal amount of inter-symbol interference (ISI), yet has an improved power spectral density over other phase shift keying modulation schemes.

GSM capability was expanded with the adoption of the Enhanced General Purpose Radio System (EGPRS) standard in 2000. This standard increased the maximum available data rate for packet traffic and control channels by expanding the number of coding schemes, and adopting a new modulation scheme, Eight-Phase Phase Shift Keying (8PSK). The eight phases of the modulated waveform represent three bits (modulo 3) of information, thus each symbol in the modulated signal is capable of representing three times the amount of information as a corresponding symbol in a GMSK modulated waveform. The EGPRS standard resulted in the adoption of nine coding/modulation schemes, MCS-1 through MCS-9, the parameters of which are summarized in Table 1 below.

TABLE 1

Coding parameters for the EGPRS coding schemes

| TRANSMISSION SCHEME | CODING RATE (User Data/ XMIT Data) | MODULATION TYPE | DATA RATE Kbit/s |
|---|---|---|---|
| MCS-9 | 1.0 | 8-PSK | 59.2 |
| MCS-8 | 0.92 | | 54.4 |
| MCS-7 | 0.76 | | 44.8 |
| MCS-6 | 0.49 | | 29.6/27.2 |
| MCS-5 | 0.37 | | 22.4 |
| MCS-4 | 1.0 | GMSK | 17.6 |
| MCS-3 | 0.80 | | 14.8/13.6 |
| MCS-2 | 0.66 | | 11.2 |
| MCS-1 | 0.53 | | 8.8 |

As Table 1 indicates, the maximum data rate is determined by both the coding rate (i.e., the ratio of user data to transmitted data) and the modulation scheme employed. For example, MCS-1 is the most robust of the nine transmission schemes, as this scheme introduces the highest overall number of coded bits into the data transmission (47% of the data transmitted is error coding information). MCS-1, however, provides the lowest data rate, as the highly coded data stream is transmitted using the lower bit-rate GMSK modulation scheme. In contrast, MCS-9 yields the highest bit rate of the nine modulation schemes by introducing a limited amount of coded bits into the data transmission thus minimizing overhead, and by using the higher bit-rate 8PSK modulation scheme. Because of the minimal of amount coding introduced in the data transmission, however, MCS-9 is the least robust of the nine transmission schemes. Higher degrees of robustness are required as the amount of interferers in a cellular region increases, or as the amount of available transmission power or the amount of sensitivity in the BS or MS decreases. The remaining transmission schemes shown in Table 1 offer various tradeoffs between data rate and transmission robustness.

The conventional approach for establishing a connection between terminals operating in a cellular region is shown in FIG. 1. After selecting a transmit power level (step 101), the BS selects the most aggressive transmission scheme (e.g., MCS-9) to exchange information with other terminals in the cell at step 103. Next, the link performance is measured at step 105 using the selected transmit power and transmission scheme. If it is determined that the link performance is acceptable at step 107, then slices of information are exchanged between the terminals at step 111 at a time slot rate (or slice rate) that ensures that the transmitting device(s) does not overheat. If, however, it is determined at step 107 that the link performance is not acceptable, a more robust transmission scheme (e.g., MCS-8) is selected at step 109, and the link performance is again evaluated at step 105. The transmission scheme selection process (i.e. steps 105–109) repeats until acceptable link performance is obtained. Once a reliable transmission scheme is selected, information is exchanged between the terminals at step 111 at a time slot rate that again ensures that the transmitting device(s) does not overheat.

While this conventional approach results in the highest available burst transfer rate being selected for the connection, it is not the most efficient method for maximizing the net data rate of a channel. The net data rate of a channel is not only affected by the channel burst transfer rate, but is also determined by the number of time slots that can be used to exchange data over a given period of time.

Cellular network regions (or cells) often operate at less than peak capacity. For example, in more rurally located cells, the available bandwidth is often such that a single user could exchange information in multiple time slots of the same TDMA frame without significantly affecting the overall performance of the cellular network. When these conditions exist, it would be advantageous to occupy as many time slots with information as possible in a given period in order to maximize the net data transfer rate. There exist, however, several factors that limit the number of time slots per given period that can be used to exchange information between a MS and BS in given cell.

An important limiting factor in determining the number of time slots available for data transfer is the amount of heat that is generated in the MS transmitter as a result of the data transmission. The amount of heat generated is directly proportional to the transmission power level of the MS, and to the number of time slots used to transmit the data or voice information. The more time slots used in a given period to transmit information, or the higher the transmission power level of the MS, the greater the amount of heat generated in the transmitter. To avoid overheating in the MS, the rate of time slot usage must be reduced, thus reducing the net data transfer rate of the device. In practice, conventional handsets have significantly limited multi-slot capability due to overheating concerns, which necessary limits the amount of bandwidth the handsets can utilize.

SUMMARY

It is therefore an object of the present invention to provide a solution for optimizing transmission power and bit rate in multi-transmission scheme communication systems employing variable modulation schemes and/or coding rates to achieve overall improved data transfer rates and power utilization.

According to the invention, this and other objects are met by a method, apparatus, and system for exchanging information in a communication system having a plurality of transmission schemes.

According to an exemplary embodiment, a first power level is selected at which slices of information are capable of being exchanged over a communication link at a first slice rate. A first transmission scheme is selected that produces an acceptable link performance when exchanging information over the communication link at the first power level. The first power level is reduced to a second power level. A second transmission scheme is selected for exchanging information over the communication link at the second power level that produces at least the acceptable link performance produced when exchanging information over the communication link at the first power level using the first transmission scheme. Finally, slices of information are exchanged over the communication link at the second power level and at a second slice rate using the second transmission scheme, wherein the second slice rate is at most equal to the first slice rate multiplied by a ratio of the first power level divided by the second power level.

According to another exemplary embodiment, a first sensitivity associated with receiving information transmitted at the first power level using the first transmission scheme is determined. A second sensitivity is calculated that is lower than the first sensitivity by an amount equivalent to the reduction in power between the first power level and the second power level. The second transmission scheme is selected as that transmission scheme having a sensitivity closest to but not exceeding the second sensitivity.

According to yet another exemplary embodiment, a plurality of sensitivities associated each of the plurality of transmission schemes is stored in a device exchanging information over the communication link.

According to yet another exemplary embodiment, the second transmission scheme is selected by selecting a transmission scheme that is a next less aggressive transmission scheme than the first transmission scheme. The link performance is measured while exchanging information over the communication link at the second power level using the next less aggressive transmission scheme. The next less aggressive transmission is selected as the second transmission scheme if the link performance of the next less aggressive transmission scheme is acceptable. If the link performance of the next less aggressive transmission scheme is not acceptable, less aggressive transmission schemes are repeatedly selected, information is exchanged over the communication link at the second power level using each respective less aggressive transmission scheme, and the link performance of each respective less aggressive transmission scheme is measured, until a selected less aggressive transmission scheme produces an acceptable link performance. The selected less aggressive transmission scheme is the second transmission scheme.

According to yet another exemplary embodiment, the first transmission scheme is selected by selecting a most aggressive transmission scheme of the plurality of transmission schemes. The link performance is measured while exchanging information over the communication link at the first power level using the most aggressive transmission scheme. The most aggressive transmission is selected as the first transmission scheme if the link performance of the most aggressive transmission scheme is acceptable. If the link performance of the most aggressive transmission scheme is not acceptable, less aggressive transmission schemes are repeatedly selected, information is exchanged over the communication link at the first power level using each respective less aggressive transmission scheme, and the link performance of each respective less aggressive transmission scheme is measured, until a selected less aggressive transmission scheme produces an acceptable link performance The selected less aggressive transmission scheme is the first transmission scheme.

According to yet another exemplary embodiment, slices of information are exchanged over the communication link at the first power level and at the first slice rate using the first transmission scheme when the slices of information cannot be exchanged at the second slice rate. The plurality of transmission schemes vary by at least one of a modulation method, an amount of error coding, and a data transfer rate. More aggressive transmission schemes have a relatively large high data transfer rate and a relatively low degree of error coding, and less aggressive transmission schemes have a relatively large low data transfer rate and a relatively high degree of error coding.

BRIEF DESCRIPTION OF THE DRAWINGS

The features, objects, and advantages of the invention will become apparent by reading this description in conjunction with the accompanying drawings, in which like reference numerals refer to like elements and in which:

FIG. 3 depicts a table showing the input signal level sensitivities for the various transmission schemes of a GSM 900 MHz band radio receiver.

DETAILED DESCRIPTION

It should be understood that the following description, while indicating preferred embodiments of the invention, is given by way of illustration only since various changes and modifications within the scope of the invention will become apparent to those skilled in the art.

Figure 2:
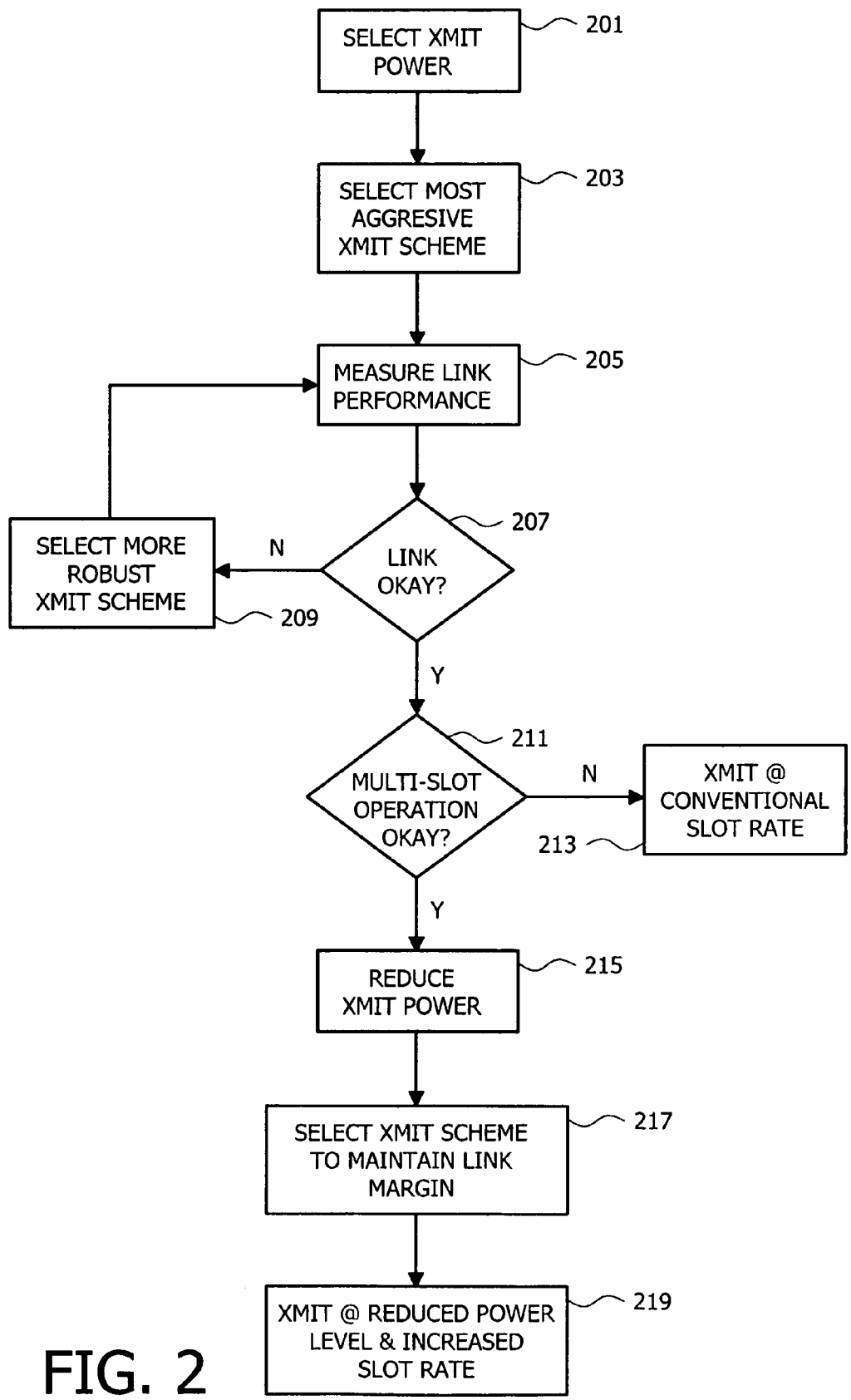
FIG. 2 depicts a flowchart describing an exemplary method of selecting a transmission scheme in a multi-transmission scheme communication network.

According to exemplary embodiments, a method, apparatus, and system are provided for exchanging information in a communication system having a plurality of transmission schemes. This may be understood by referring to FIG. 2, in which an exemplary method of selecting a transmission scheme in a multi-transmission scheme communication network is shown. The method begins at step 201 where a transmission power for a transmitting device (e.g., a BS or a MS in a cellular network) is selected for exchanging information with other terminals operating in the same region. This selection may occur in either the transmitting device or in a receiving device in the communication network, either prior to or during the exchange of information.

Selection of a power level may depend on several factors. For example, if the power-selecting device is a MS, the maximum power level may be constrained by the limited amount of battery power available in the mobile device. The type of access technology used to exchange information in the region may also be a factor. For example, depending on system and environmental conditions in a cell, it may require less power to transmit information using one type of access technology, say GSM, rather than using an alternative access technology, such as Code Division Multiple Access (CDMA). Finally, the transmission power may be selected so as to minimize the amount of interference introduced into other nearby cells.

After selecting a transmit power level (step 201), the most aggressive transmission scheme available to exchange information with other terminals operating in the cell is then selected at step 103. For example, in the EGPRS system described above, the MCS-9 transmission scheme would be selected. Recall that this transmission scheme offers the highest available burst transfer rate (i.e., 59.2 Kbit/s; see Table 1) by minimizing the amount coding overhead introduced in the transmission, and by utilizing a more aggressive modulation scheme (8PSK).

Next, the link performance is measured at step 205 using the selected transmit power level and transmission scheme. Several methods of measuring the link performance are available. For example, a system for monitoring and sending "reports" on separate control channels can be established for evaluating the quality of the link. The design and operation of such link performance evaluation systems are known to the art, and therefore the specific details of such need not be discussed here.

Having measured the link performance at step 205, a determination is then made at step 207 as to whether the performance is sufficient to reliably maintain a connection between terminals in the cell. If it is determined at step 207 that the link performance is not acceptable, a more robust transmission scheme is selected at step 209, and the link performance is again evaluated at step 205. For example, in the EGPRS system described above, if it were determined at step 207 that the link performance using the MCS-9 transmission scheme is unacceptable, the MCS-8 transmission scheme would then be selected (as so on) and the link performance re-measured to determine if the link can be reliably sustained. Recall that the MCS-8 transmission scheme offers a lower burst transfer rate (i.e., 54.4 Kbit/s; see Table 1) than does the MCS-9 scheme, but provides for a more robust connection by adding additional error correction coding into the transmission.

This initial transmission scheme selection process as defined by steps 201 through 209 is repeated until a transmission scheme offering an acceptable link performance is selected.

Figure 1:
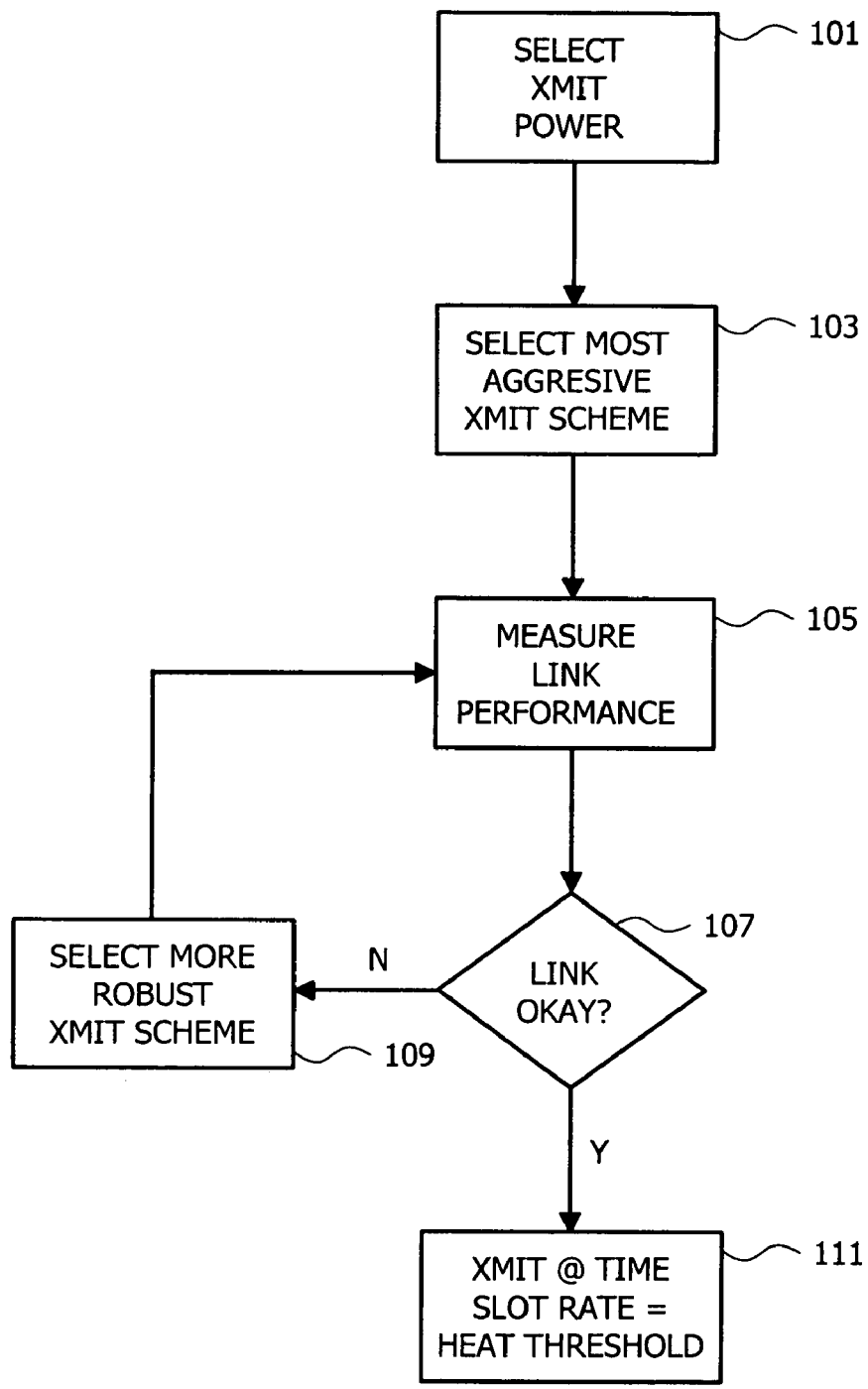
FIG. 1 depicts a flowchart describing a conventional method of selecting a transmission scheme in a multi-transmission scheme communication network.

In comparing steps 201–209 with steps 101–109 in FIG. 1, it will be apparent that the initial steps of selecting a transmission scheme capable of reliably sustaining a link connection are the same. As discussed above, these initial steps result in the selection of a maximum available burst transfer rate for the connection. This initial selection process, however, does not necessary result in the selection of an optimal transmission scheme, however, that will maximize the net data rate of a channel. Recall that the net data rate of a channel is not only affected by the channel burst transfer rate, but is also determined by the number of time slots that can used to exchange data over a given period of time.

Utilizing a higher number of time slots (or information slices) per given period of time will be referred to as multi-slot (or multi-slice) operation. Multi-slot operation will most often be possible in more rurally located cells, or in normally high-traffic cells during the off-peak hours of operation. Techniques for measuring the amount of network traffic in a cell and for measuring the amount of available cell bandwidth, in order to determine whether multi-slot operation is possible, are known to the art. Therefore the specific details of such techniques need not be discussed further here.

When multi-slot operation is possible in the cell, it may be preferable, depending on the access technology employed, to send information over the link at a lower transmit power level using a transmission scheme that has a lower burst transfer rate than the maximum available burst transfer rate for the connection. This is especially true when either multi-slot operation is constrained because of overheating in the transmitting device, or when it is desirable to reduce the transmission power in a device in order to minimize the amount of interference introduced into the transmissions of other nearby devices.

Selecting the most aggressive transmission scheme very often requires transmitting the desired information at the highest available power level. Recall that the most aggressive transmission schemes typically have the least amount of error coding overhead (see Table 1). Error coding allows receivers to reconstruct weakly transmitted signals that are affected by the environment conditions (e.g., interferers) of the channel. If the amount of error coding in the transmitted signal is reduced, the information must be transmitted at a higher power level to reduce the influence of the interferers on the received signal. Increasing the transmit power level, however, reduces the frequency at which time slots can be used (referred to as the slot rate) when overheating is a concern, and increases the amount of interference introduced into nearby transmission. If transmitting information at a lower power level allows the slot rate to be increased, the result may be an increase in the net data transfer rate of the channel.

For example, in the EGPRS system described above, assume the channel characteristics and link performance are such that the initial transmission scheme selection process (i.e., steps 201 through 209 in FIG. 2) selects MCS-9 as the transmission scheme for the connection. This scheme provides the minimum amount of error correction code overhead in the data transmission at the most aggressive level of modulation, resulting in the highest available burst transfer rate of 59.2 Kbit/s (see Table 1). Assuming the transmitter sends data in one time slot per second, the net channel data rate will be 59.2 Kbit/s. If the transmitter were to be able to send data in two time slots per second, however, the net data rate would be doubled, or 118.4 Kbit/s. Yet the transmitter may be unable to increase the slot rate, either because of overheating, or perhaps because of interference concerns. Nevertheless, It would be desirable to increase the slot rate in the face of these concerns whenever multi-slot operation is desired and/or is feasible.

Referring once again to FIG. 2, a determination is made at step 211 whether multi-slot operation is desired and/or is feasible. This determination may be made in several ways. For example, the determination may be made based on the current traffic conditions in the network region, or based on the time of day. The determination may be made automatically by the transmitting or receiving device, or may be the result of user command input to enter a multi-slot operating mode.

If it is determined at step 211 that multi-slot operation is desired and/or is feasible, the transmit power level in the transmitter is reduced by some percentage at step 215. To account for this percentage reduction in transmit power level, the receiver sensitivity will have to be increased accordingly to maintain the link margin present before the power reduction. Not unexpectedly, receiver sensitivity varies with the transmission scheme used to transmit the information. Transmission schemes incorporating greater amounts of error correction coding (e.g., MCS-5) require a lower sensitivity at the receiver than do transmission schemes that incorporate lesser amounts of error correction coding (e.g., MCS-9).

For example, FIG. 3 depicts a table showing the input signal level sensitivities for the various transmission schemes of an EGPRS compatible radio receiver (e.g., a GSM 900 MHz band receiver). According to this table, a receiver operating under TU50 propagation conditions (typical urban conditions at a vehicle speed of 50 km/hr) and no frequency hopping (no FH) must have an input sensitivity of −80 dBm to receive a MCS-9 modulated signal. To receive a MCS-8 modulated signal, however, the receiver sensitivity need only be −84 dBm, thus allowing for 4 dBm of additional channel attenuation to occur. Assuming the environmental conditions (e.g., interferers, etc.) for the channel remain constant, this 4 dBm margin can be used to reduced the transmit power level by 50% (i.e., −3 dBm), and still maintain an acceptable link margin.

A reduction in transmit power level necessarily leads to a proportional reduction of heating in the transmitter. Continuing with the above example, a 50% reduction in the transmit power level will allow the slot rate to be doubled without appreciably increasing the amount of heating in the transmitter. If an alternative transmission scheme can be selected to maintain the link margin at the reduced power level, the increased slot rate can be maintained without increasing heating in the transmitter. Moreover, the reduced transmit power level will reduce the disruption of other nearby transmissions.

Returning to FIG. 2, after the transmit power is reduced at step 215, a new transmission scheme is selected at step 217 to maintain at least the link margin present at the former increased transmit power level. The selection is made such that the reduction in receiver input sensitivity between the previous and new transmission schemes is at least equivalent to the reduction in power level. For example, in the EGPRS system described above, assume the transmitter is sending information using the MCS-9 coding/modulation scheme at a first transmit power level, and that the transmit power level is then reduced by 9 dB. Referring once again to FIG. 3, one can see that for a receiver operating under TU50 propagation conditions and no frequency hopping (no FH), any the modulation schemes MCS-7 through MCS-5 could be chosen. That is, the reduction in sensitivity when using the MCS-9 scheme (−80 dBm) would at least equal the 9 dB reduction in transmit power when using any of the schemes MCS-7 (−89 dBm) through MCS-5 (−96.5 dBm). Preferably, MCS-7 would be chosen as the new transmission scheme, as this scheme offers the highest burst transfer rate among these satisfactory transmission schemes.

One approach for selecting the new transmission scheme would be to store receiver sensitivity information, such as that shown in FIG. 3, for various access technologies in the communication devices. These devices may then access this information when selecting a transmission scheme for multi-slot operation. Alternatively, the communication devices may use an adaptive approach of iteratively selecting more robust transmission schemes and measuring the link margin at the reduced power level until a transmission scheme is selected having at least the link margin present when transmitting at the former increased power level.

Referring again to FIG. 2, after a new transmission scheme is selected at step 217, the transmitter may then transmit information at the reduced power level, and at a corresponding increased slot rate. The increased slot rate is chosen such that power consumption in the transmitter remains substantially the same as when transmitting at the former increased power level. Depending on the access technology employed, this may result in a significant increase in the net data transfer rate of the channel.

As an illustration, consider the EGPRS example described above, in which the transmitter was sending information using the MCS-9 coding/modulation scheme (requiring a receiver input sensitivity of −80 dBm) at a first transmit power level, and then the transmit power level was reduced by 9 dB. To maintain at least the link margin present before the power reduction, it was determined that a transmission scheme at least as robust as MCS-7 (requiring a receiver input sensitivity of −89 dBm; equal to the reduction in transmit power) would have to be employed. Because the transmit power level has been reduced by a factor of eight (−9 dB), the slot rate can be increased by eightfold without substantially increasing power consumption, and consequently heating, in the transmitter.

Assuming before the power reduction the transmitter sends data using the MCS-9 scheme at a slot rate of one time slot per second, the net channel data transfer rate will be 59.2 Kbit/s. Following the 9 dB power reduction, the transmitter sends data using the lower burst rate and more robust MCS-7 scheme, but at an increased slot rate of eight time slots per second. This results in the net data transfer rate being increased to 8 times 44.8 Kbit/s or 358.4 Kbit/s. This dramatic increase in the net data transfer rate may be realized as long as the available cell bandwidth is such that 8× multi-slot operation is feasible.

Returning to FIG. 2, if at step 211 it is determined that the multi-slot operation is not desired nor feasible, information is transmitted, at step 213, using the most aggressive transmission scheme the connection will support at the conventional slot rate.

While the particular embodiments described above use a slotted TDMA communication system as illustration, it will be understand that the concepts described above may be extended to any communication system using multiple transmission schemes. Terms such as "slot" and "channel" are not to be interpreted as limiting the scope of the described concepts, but are merely used to illustrate the possible mechanisms in which information may be exchanged within a communication system. Moreover, while particular embodiments may have described certain concepts in the context of information being transferred from a mobile station to a base station, or vice versa, it will be understood that the described concepts apply equally to transmissions originating from either a mobile stations or a base station operating within the communication system.

It should be emphasized that the terms "comprises" and "comprising", when used in this specification as well as the claims, are taken to specify the presence of stated features, integers, steps or components; but the use of these terms does not preclude the presence or addition of one or more other features, integers, steps, components or groups thereof.

The various aspects of the invention have been described in connection with a number of exemplary embodiments. To facilitate an understanding of the invention, many aspects of the invention were described in terms of sequences of actions that may performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

The invention has been described with reference to particular embodiments. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for exchanging information in a communication system having a plurality of transmission schemes, the method comprising the steps of:
    selecting a first power level at which slices of information are capable of being exchanged over a communication link at a first slice rate;
    selecting a first transmission scheme that produces an acceptable link performance when exchanging information over the communication link at the first power level;
    reducing the first power level to a second power level;
    selecting a second transmission scheme for exchanging information over the communication link at the second power level that produces at least the acceptable link performance produced when exchanging information over the communication link at the first power level using the first transmission scheme; and
    exchanging slices of information over the communication link at the second power level and at a second slice rate using the second transmission scheme, wherein the second slice rate is at most equal to the first slice rate multiplied by a ratio of the first power level divided by the second power level,
    wherein the step of selecting the second transmission scheme comprises the steps of:
    determining a first sensitivity associated with receiving information transmitted at the first power level using the first transmission scheme;
    calculating a second sensitivity lower than the first sensitivity by an amount equivalent to the reduction in power between the first power level and the second power level; and
    selecting the second transmission scheme as that transmission scheme having a sensitivity closest to but not exceeding the second sensitivity.

2. The method of claim 1, wherein a plurality of sensitivities associated with each of the plurality of transmission schemes is stored in a device exchanging information over the communication link.

3. The method of claim 1, wherein the step of selecting the first transmission scheme comprises the steps of:
    selecting a most aggressive transmission scheme of the plurality of transmission schemes;
    measuring the link performance while exchanging information over the communication link at the first power level using the most aggressive transmission scheme;
    selecting the most aggressive transmission as the first transmission scheme if the link performance of the most aggressive transmission scheme is acceptable; and
    if the link performance of the most aggressive transmission scheme is not acceptable, repeatedly selecting less aggressive transmission schemes, exchanging information over the communication link at the first power level using each respective less aggressive transmission scheme, and measuring the link performance of each respective less aggressive transmission scheme, until a selected less aggressive transmission scheme produces an acceptable link performance, wherein the selected less aggressive transmission scheme is the first transmission scheme.

4. The method of claim 1, wherein the plurality of transmission schemes vary by at least one of a modulation method, an amount of error coding, and a data transfer rate.

5. The method of claim 4, wherein:
a less robust transmission scheme has a higher data transfer rate and a lower degree of error coding compared to a more robust transmission scheme, and
the more robust transmission scheme has a lower data transfer rate and a higher degree of error coding compared to the less robust transmission scheme.

6. The method of claim 1, wherein the communication system is a time division multiple access (TDMA) system, and the first and second slice rates correspond to the rates at which bursts of information are transmitted in time slots.

7. A method for exchanging information in a communication system having a plurality of transmission schemes, the method comprising the steps of:
selecting a first power level at which slices of information are capable of being exchanged over a communication link at a first slice rate;
selecting a first transmission scheme that produces an acceptable link performance when exchanging information over the communication link at the first power level;
reducing the first power level to a second power level;
selecting a second transmission scheme for exchanging information over the communication link at the second power level that produces at least the acceptable link performance produced when exchanging information over the communication link at the first power level using the first transmission scheme; and
exchanging slices of information over the communication link at the second power level and at a second slice rate using the second transmission scheme, wherein the second slice rate is at most equal to the first slice rate multiplied by a ratio of the first power level divided by the second power level,
wherein the step of selecting the second transmission scheme comprises the steps of:
selecting a transmission scheme that is a next less aggressive transmission scheme than the first transmission scheme;
measuring the link performance while exchanging information over the communication link at the second power level using the next less aggressive transmission scheme;
selecting the next less aggressive transmission as the second transmission scheme if the link performance of the next less aggressive transmission scheme is acceptable; and
if the link performance of the next less aggressive transmission scheme is not acceptable, repeatedly selecting less aggressive transmission schemes, exchanging information over the communication link at the second power level using each respective less aggressive transmission scheme, and measuring the link performance of each respective less aggressive transmission scheme, until a selected less aggressive transmission scheme produces an acceptable link performance, wherein the selected less aggressive transmission scheme is the second transmission scheme.

8. A method for exchanging information in a communication system having a plurality of transmission schemes, the method comprising the steps of:
selecting a first power level at which slices of information are capable of being exchanged over a communication link at a first slice rate;
selecting a first transmission scheme that produces an acceptable link performance when exchanging information over the communication link at the first power level;
reducing the first power level to a second power level;
selecting a second transmission scheme for exchanging information over the communication link at the second power level that produces at least the acceptable link performance produced when exchanging information over the communication link at the first power level using the first transmission scheme;
exchanging slices of information over the communication link at the second power level and at a second slice rate using the second transmission scheme, wherein the second slice rate is at most equal to the first slice rate multiplied by a ratio of the first power level divided by the second power level; and
exchanging slices of information over the communication link at the first power level and at the first slice rate using the first transmission scheme when the slices of information cannot be exchanged at the second slice rate.

9. A method for exchanging information in a communication system having a plurality of transmission schemes, the method comprising the steps of:
selecting a first power level at which slices of information are capable of being exchanged over a communication link at a first slice rate;
selecting a first transmission scheme that produces an acceptable link performance when exchanging information over the communication link at the first power level;
reducing the first power level to a second power level;
selecting a second transmission scheme for exchanging information over the communication link at the second power level that produces at least the acceptable link performance produced when exchanging information over the communication link at the first power level using the first transmission scheme; and
exchanging slices of information over the communication link at the second power level and at a second slice rate using the second transmission scheme, wherein the second slice rate is at most equal to the first slice rate multiplied by a ratio of the first power level divided by the second power level,
wherein the method is implemented in a mobile station, whereby a net data transfer rate of the communication link is increased without substantially increasing an amount of heat generated in the mobile station.

10. A method for exchanging information in a communication system having a plurality of transmission schemes, the method comprising the steps of:
selecting a first power level at which slices of information are capable of being exchanged over a communication link at a first slice rate;
selecting a first transmission scheme that produces an acceptable link performance when exchanging information over the communication link at the first power level;
reducing the first power level to a second power level;

selecting a second transmission scheme for exchanging information over the communication link at the second power level that produces at least the acceptable link performance produced when exchanging information over the communication link at the first power level using the first transmission scheme; and exchanging slices of information over the communication link at the second power level and at a second slice rate using the second transmission scheme, wherein the second slice rate is at most equal to the first slice rate multiplied by a ratio of the first power level divided by the second power level, wherein the method is implemented in a base station, whereby a net data transfer rate of the communication link is increased without substantially increasing an amount of interference injected into nearby transmissions.

11. An apparatus for exchanging information in a communication system having a plurality of transmission schemes, the apparatus comprising:

logic that selects a first power level at which slices of information are capable of being exchanged over a communication link at a first slice rate;

logic that selects a first transmission scheme that produces an acceptable link performance when exchanging information over the communication link at the first power level;

logic that reduces the first power level to a second power level;

logic that selects a second transmission scheme for exchanging information over the communication link at the second power level that produces at least the acceptable link performance produced when exchanging information over the communication link at the first power level using the first transmission scheme; and a transceiver for exchanging slices of information over the communication link at the second power level and at a second slice rate using the second transmission scheme, wherein the second slice rate is at most equal to the first slice rate multiplied by a ratio of the first power level divided by the second power level, wherein the logic that selects the second transmission scheme comprises:

logic that determines a first sensitivity associated with receiving information transmitted at the first power level using the first transmission scheme;

logic that calculates a second sensitivity lower than the first sensitivity by an amount equivalent to the reduction in power between the first power level and the second power level; and logic that selects the second transmission scheme as that transmission scheme having a sensitivity closest to but not exceeding the second sensitivity.

12. The apparatus of claim 11, wherein a plurality of sensitivities associated with each of the plurality of transmission schemes is stored in a device exchanging information over the communication link.

13. The apparatus of claim 11, wherein the logic that selects the first transmission scheme comprises:

logic that selects a most aggressive transmission scheme of the plurality of transmission schemes;

logic that measures the link performance while exchanging information over the communication link at the first power level using the most aggressive transmission scheme;

logic that selects the most aggressive transmission as the first transmission scheme if the link performance of the most aggressive transmission scheme is acceptable; and logic that, if the link performance of the most aggressive transmission scheme is not acceptable, repeatedly selects less aggressive transmission schemes, exchanges information over the communication link at the first power level using each respective less aggressive transmission scheme, and measures the link performance of each respective less aggressive transmission scheme, until a selected less aggressive transmission scheme produces an acceptable link performance, wherein the selected less aggressive transmission scheme is the first transmission scheme.

14. The apparatus of claim 11, wherein the plurality of transmission schemes vary by at least one of a modulation method, an amount of error coding, and a data transfer rate.

15. The apparatus of claim 14, wherein: a less robust transmission scheme has a higher data transfer rate and a lower degree of error coding compared to a more robust transmission scheme, and the more robust transmission scheme has a lower data transfer rate and a higher degree of error coding compared to the less robust transmission scheme.

16. The apparatus of claim 11, wherein the communication system is a time division multiple access (TDMA) system, and the first and second slice rates correspond to the rates at which bursts of information are transmitted in time slots.

17. An apparatus for exchanging information in a communication system having a plurality of transmission schemes, the apparatus comprising:

logic that selects a first power level at which slices of information are capable of being exchanged over a communication link at a first slice rate;

logic that selects a first transmission scheme that produces an acceptable link performance when exchanging information over the communication link at the first power level;

logic that reduces the first power level to a second power level;

logic that selects a second transmission scheme for exchanging information over the communication link at the second power level that produces at least the acceptable link performance produced when exchanging information over the communication link at the first power level using the first transmission scheme; and a transceiver for exchanging slices of information over the communication link at the second power level and at a second slice rate using the second transmission scheme, wherein the second slice rate is at most equal to the first slice rate multiplied by a ratio of the first power level divided by the second power level, wherein the logic that selects the second transmission scheme comprises:

logic that selects a transmission scheme that is a next less aggressive transmission scheme than the first transmission scheme;

logic that measures the link performance while exchanging information over the communication link at the second power level using the next less aggressive transmission scheme;

logic that selects the next less aggressive transmission as the second transmission scheme if the link performance of the next less aggressive transmission scheme is acceptable; and logic that, if the link performance of the next less aggressive transmission scheme is not acceptable, repeatedly selects less aggressive transmission schemes, exchanges information over the communication link at the second power level using each respective less aggressive transmission scheme, and measures the link performance of each respective less aggressive transmission scheme, until a selected less aggressive transmission scheme produces an acceptable link performance, wherein the selected less aggressive transmission scheme is the second transmission scheme.

18. An apparatus for exchanging information in a communication system having a plurality of transmission schemes, the apparatus comprising:

logic that selects a first power level at which slices of information are capable of being exchanged over a communication link at a first slice rate;

logic that selects a first transmission scheme that produces an acceptable link performance when exchanging information over the communication link at the first power level;

logic that reduces the first power level to a second power level;

logic that selects a second transmission scheme for exchanging information over the communication link at the second power level that produces at least the acceptable link performance produced when exchanging information over the communication link at the first power level using the first transmission scheme; and a transceiver for exchanging slices of information over the communication link at the second power level and at a second slice rate using the second transmission scheme, wherein the second slice rate is at most equal to the first slice rate multiplied by a ratio of the first power level divided by the second power level, wherein the transceiver exchanges slices of information over the communication link at the first power level and at the first slice rate using the first transmission scheme when the slices of information cannot be exchanged at the second slice rate.

19. An apparatus for exchanging information in a communication system having a plurality of transmission schemes, the apparatus comprising:

logic that selects a first power level at which slices of information are capable of being exchanged over a communication link at a first slice rate;

logic that selects a first transmission scheme that produces an acceptable link performance when exchanging information over the communication link at the first power level;

logic that reduces the first power level to a second power level;

logic that selects a second transmission scheme for exchanging information over the communication link at the second power level that produces at least the acceptable link performance produced when exchanging information over the communication link at the first power level using the first transmission scheme; and a transceiver for exchanging slices of information over the communication link at the second power level and at a second slice rate using the second transmission scheme, wherein the second slice rate is at most equal to the first slice rate multiplied by a ratio of the first power level divided by the second power level, wherein the apparatus is implemented in a mobile station, whereby a net data transfer rate of the communication link is increased without substantially increasing an amount of heat generated in the mobile station.

20. An apparatus for exchanging information in a communication system having a plurality of transmission schemes, the apparatus comprising:

logic that selects a first power level at which slices of information are capable of being exchanged over a communication link at a first slice rate;

logic that selects a first transmission scheme that produces an acceptable link performance when exchanging information over the communication link at the first power level;

logic that reduces the first power level to a second power level;

logic that selects a second transmission scheme for exchanging information over the communication link at the second power level that produces at least the acceptable link performance produced when exchanging information over the communication link at the first power level using the first transmission scheme; and a transceiver for exchanging slices of information over the communication link at the second power level and at a second slice rate using the second transmission scheme, wherein the second slice rate is at most equal to the first slice rate multiplied by a ratio of the first power level divided by the second power level, wherein the apparatus is implemented in a base station, whereby a net data transfer rate of the communication link is increased without substantially increasing an amount of interference injected into nearby transmissions.

21. A communication system having a plurality of transmission schemes, the system comprising:

at least one base station;

at least one mobile station coupled to the at least base station by a corresponding communication link;

logic that selects a first power level at which slices of information are capable of being exchanged over the communication link at a first slice rate;

logic that selects a first transmission scheme that produces an acceptable link performance when exchanging information over the communication link at the first power level;

logic that reduces the first power level to a second power level;

logic that selects a second transmission scheme for exchanging information over the communication link at the second power level that produces at least the acceptable link performance produced when exchanging information over the communication link at the first power level using the first transmission scheme; and a transceiver in each of the at least one mobile and base stations for exchanging slices of information over the communication link at the second power level and at a second slice rate using the second transmission scheme, wherein the second slice rate is at most equal to the first slice rate multiplied by a ratio of the first power level divided by the second power level, wherein the logic that selects the second transmission scheme comprises:

logic that determines a first sensitivity associated with receiving information transmitted at the first power level using the first transmission scheme;

logic that calculates a second sensitivity lower than the first sensitivity by an amount equivalent to the reduction in power between the first power level and the second power level; and logic that selects the second transmission scheme as that transmission scheme having a sensitivity closest to but not exceeding the second sensitivity.

22. The system of claim 21, wherein a plurality of sensitivities associated with each of the plurality of transmission schemes is stored in at least one of the at least one mobile and base stations.

23. The system of claim 21, wherein the logic that selects the first transmission scheme comprises:
   logic that selects a most aggressive transmission scheme of the plurality of transmission schemes;
   logic that measures the link performance while exchanging information over the communication link at the first power level using the most aggressive transmission scheme;
   logic that selects the most aggressive transmission as the first transmission scheme if the link performance of the most aggressive transmission scheme is acceptable; and
   logic that, if the link performance of the most aggressive transmission scheme is not acceptable, repeatedly selects less aggressive transmission schemes, exchanges information over the communication link at the first power level using each respective less aggressive transmission scheme, and measures the link performance of each respective less aggressive transmission scheme, until a selected less aggressive transmission scheme produces an acceptable link performance, wherein the selected less aggressive transmission scheme is the first transmission scheme.

24. The system of claim 21, wherein the plurality of transmission schemes vary by at least one of a modulation method, an amount of error coding, and a data transfer rate.

25. The system of claim 24, wherein:
   a less robust transmission scheme has a higher data transfer rate and a lower degree of error coding compared to a more robust transmission scheme, and
   the more robust transmission scheme has a lower data transfer rate and a higher degree of error coding compared to the less robust transmission scheme.

26. The system of claim 21, wherein the communication system is a time division multiple access (TDMA) system, and the first and second slice rates correspond to the rates at which bursts of information are transmitted in time slots.

27. A communication system having a plurality of transmission schemes, the system comprising:
   at least one base station;
   at least one mobile station coupled to the at least base station by a corresponding communication link;
   logic that selects a first power level at which slices of information are capable of being exchanged over the communication link at a first slice rate;
   logic that selects a first transmission scheme that produces an acceptable link performance when exchanging information over the communication link at the first power level,
   logic that reduces the first power level to a second power level;
   logic that selects a second transmission scheme for exchanging information over the communication link at the second power level that produces at least the acceptable link performance produced when exchanging information over the communication link at the first power level using the first transmission scheme; and
   a transceiver in each of the at least one mobile and base stations for exchanging slices of information over the communication link at the second power level and at a second slice rate using the second transmission scheme, wherein the second slice rate is at most equal to the first slice rate multiplied by a ratio of the first power level divided by the second power level,
   wherein the logic that selects the second transmission scheme comprises:
   logic that selects a transmission scheme that is a next less aggressive transmission scheme than the first transmission scheme;
   logic that measures the link performance while exchanging information over the communication link at the second power level using the next less aggressive transmission scheme;
   logic that selects the next less aggressive transmission as the second transmission scheme if the link performance of the next less aggressive transmission scheme is acceptable; and
   logic that, if the link performance of the next less aggressive transmission scheme is not acceptable, repeatedly selects less aggressive transmission schemes, exchanges information over the communication link at the second power level using each respective less aggressive transmission scheme, and measures the link performance of each respective less aggressive transmission scheme, until a selected less aggressive transmission scheme produces an acceptable link performance, wherein the selected less aggressive transmission scheme is the second transmission scheme.

28. A communication system having a plurality of transmission schemes, the system comprising:
   at least one base station;
   at least one mobile station coupled to the at least base station by a corresponding communication link;
   logic that selects a first power level at which slices of information are capable of being exchanged over the communication link at a first slice rate;
   logic that selects a first transmission scheme that produces an acceptable link performance when exchanging information over the communication link at the first power level,
   logic that reduces the first power level to a second power level;
   logic that selects a second transmission scheme for exchanging information over the communication link at the second power level that produces at least the acceptable link performance produced when exchanging information over the communication link at the first power level using the first transmission scheme; and
   a transceiver in each of the at least one mobile and base stations for exchanging slices of information over the communication link at the second power level and at a second slice rate using the second transmission scheme, wherein the second slice rate is at most equal to the first slice rate multiplied by a ratio of the first power level divided by the second power level,
   wherein each transceiver exchanges slices of information over the communication link at the first power level and at the first slice rate using the first transmission scheme when the slices of information cannot be exchanged at the second slice rate.

* * * * *